(12) United States Patent
Carballido

(10) Patent No.: US 6,740,374 B2
(45) Date of Patent: May 25, 2004

(54) CAP CLOSURE AND DETACHABLE LINER

(75) Inventor: Jose Luis Martinez Carballido, Monterrey (MX)

(73) Assignee: Fabricas Monterrey, S.A. de C.V., Monterrey (MX)

( * ) Notice: Subject to any disclaimer, the term of this patent is extended or adjusted under 35 U.S.C. 154(b) by 85 days.

(21) Appl. No.: 10/036,366

(22) Filed: Jan. 7, 2002

(65) Prior Publication Data

US 2003/0129334 A1 Jul. 10, 2003

(51) Int. Cl.[7] .......................... B32B 3/02; B65D 41/00; B65D 41/12; B65D 53/04; B65D 41/10
(52) U.S. Cl. .................... 428/35.7; 428/64.1; 428/66.3; 428/66.4; 428/66.5; 215/230; 215/341; 215/347; 215/316; 215/353
(58) Field of Search ................. 215/230, 341, 215/347, 316, 324, 327, 328, 329, 353; 428/66.3, 66.4, 66.5, 64.1, 35.7; 40/311; 425/809

(56) References Cited

U.S. PATENT DOCUMENTS

| | | | |
|---|---|---|---|
| 3,257,021 A | 6/1966 | Brockett | 215/39 |
| 3,581,690 A | 6/1971 | Zapata | 113/80 |
| 4,272,313 A * | 6/1981 | Mori et al. | 156/262 |
| 4,310,100 A | 1/1982 | Kunimoto et al. | 215/228 |
| 4,684,426 A * | 8/1987 | Takayama | 156/220 |
| 4,957,949 A | 9/1990 | Kamada et al. | 523/201 |
| 5,091,006 A | 2/1992 | Sarada et al. | 106/22 |
| 5,217,646 A | 6/1993 | McFarland | 252/301.35 |
| 5,221,288 A | 6/1993 | Kamada et al. | 8/554 |
| 6,139,779 A | 10/2000 | Small et al. | 252/583 |
| 6,165,557 A * | 12/2000 | Blum et al. | 427/385.5 |
| 6,183,827 B1 | 2/2001 | Folchini et al. | 428/64.1 |

* cited by examiner

Primary Examiner—Harold Pyon
Assistant Examiner—Chris Bruenjes
(74) Attorney, Agent, or Firm—Oblon, Spivak, McClelland, Maier & Neustadt, P.C.

(57) ABSTRACT

The present invention provides a container closure, including:
- a metal closure shell having a top surface and a bottom surface, the top and bottom surfaces having at least one varnish coating thereon;
- a detachable sealing liner in contact with a portion of the bottom surface; and
- a print layer containing a polyester ink and interposed between the bottom surface and the liner;
- wherein the liner includes a PVC resin,
- wherein the print layer is in direct contact with the liner and the varnish coating on the bottom surface. Other embodiments include methods for making and using the closure.

19 Claims, 1 Drawing Sheet

CAP CLOSURE AND DETACHABLE LINER

BACKGROUND OF THE INVENTION

1. Field of the Invention

The present invention relates to a cap closure having a metallic printed shell covered by a varnish coat and a detachable liner with a printed image on it. The cap closure is particularly suitable for sealing carbonated and non carbonated beverage containers.

2. Discussion of the Background

Crowns caps are metallic closures for glass or plastic containers designed for carbonated and non-carbonated beverages, such as beer, softdrinks, juices, etc. Generally they are composed of a metallic shell and an interior sealing liner to retain internal pressure.

Beverage makers promote their products with a closure by differentiating them from the rest and by using the closure for promotional purposes. There are several ways to use crown caps to promote an event. First, the promotion can be printed under a nondetachable liner. Second, the promotion can be printed under the crown cap liner using an opaque sealing liner that can be detached in order to see the printed item on the crown shell. Third, the sealing liner can be detached together with the printed item. This allows the consumer to easily mail in the evidence of the prize, with the printed imaged on it, without having to mail in the prized crown cap.

Several lithographic sequences have been developed to allow the printed ink to be transferable to the sealing liner when the sealing liner is removed. These sequences are both time consuming and subject to reduction of quality.

Multilayer cap and liner assemblies are described in, e.g., U.S. Pat. No. 3,581,690 and 4,310,100, but these multilayer assemblies are difficult and time consuming to manufacture, and they involve multiple material layers in the liner.

Other closures are described in U.S. Pat. No. 3,257,021, but these contain plastisol inks, which are undesirable. Plastisol line molding is an old technology which uses lining technology not available today. In addition, it is not possible to use plastisol inks with lithographic printing systems. Finally, plastisol inks have poor properties with respect to tack, flow, color strength, and the like compared to conventional lithographic inks.

Other closures are described in U.S. Pat. No. 6,183,827, but these are limited to expensive non-PVC-containing sealing liners because of market requirements and metallic adhesive paints in the shell.

Accordingly, it would be desirable to provide a cap closure with a detachable liner and a print layer suitable for promotional, information and novelty purposes, which avoids, e.g., the problems associated with multiple layer systems and expensive non-pvc liners, and which can be easily printed.

SUMMARY OF THE INVENTION

One object of the present invention is to provide a crown cap with a detachable liner, particularly for promotional purposes in which is necessary to detach the liner from the crown.

Another object of the present invention is to provide a crown cap having a detachable sealing liner for beverage containers which avoids the problems with conventional closures.

Another object of the present invention is to provide a crown cap having a detachable sealing liner for beverage containers which can be more easily manufactured.

Another object of the present invention is to provide a crown cap having a detachable sealing liner for beverage containers wherein an inscription therein can be easily and completely together with the sealing liner.

Another object of the present invention is to provide a crown cap having a detachable sealing liner for beverage containers which uses a minimum of materials and steps in the process of manufacture.

Another object of the present invention is to provide a crown cap having a detachable sealing liner for beverage containers which avoids the multiple layers typically used in the conventional closures and procedures.

These and other objects have been achieved by the present invention, the first embodiment of which provides a container closure, including:

a metal closure shell having a top surface and a bottom surface, the top and bottom surfaces having at least one varnish coating thereon;

a detachable sealing liner in contact with a portion of the bottom surface; and a print layer containing a polyester ink and interposed between the bottom surface and the liner;

wherein the liner includes a PVC resin, wherein the print layer is in direct contact with the liner and the varnish coating on the bottom surface.

Another embodiment of the present invention provides method for sealing a container opening, which includes contacting the above-mentioned closure with the container opening.

Another embodiment of the present invention provides a method, which includes:

removing the above-mentioned closure from a container sealed with the closure, and detaching the liner.

Another embodiment of the present invention provides an article, which includes:

a container having an opening; and the above-mentioned closure in contact with the container and sealing the opening.

Another embodiment of the present invention provides a method for making the above-mentioned closure, which includes:

contacting the shell, the print layer and the liner.

Another embodiment of the present invention provides a closure, which includes:

a metal closure having a means for fitting over an opening of a container;

a PVC-containing detachable sealing liner in contact with a portion of the metal closure and having a means for sealing the opening of the container;

a print layer interposed between and in contact with the closure and the liner; and a means for transferring the print layer to the liner when the liner is detached from the closure.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
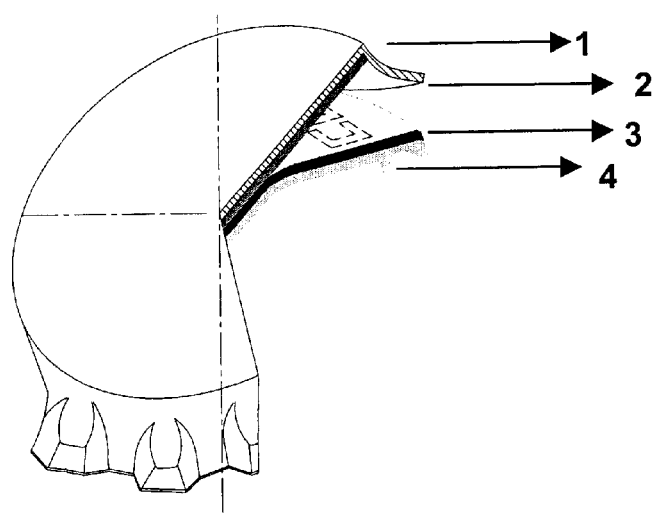
FIG. 1 shows a preferred embodiment of the cap of the present invention.

Various other objects, features and attendant advantages of the present invention will be more fully appreciated as the same becomes better understood from the following detailed description of the preferred embodiments of the invention.

The present invention achieves desired promotional features without sacrificing the functional properties of the crown cap. The "easy removal" liner achieves this objective in a simpler process.

The present invention is particularly suited for promotional purposes in which a printed image is included with a closure for a container and the consumer can find promotional information in the printed image when a liner is detached from the closure.

Preferably, the closure is used for beverage containers.

The closure may be a crown-shaped closure or a screw closure. Preferably, it is a crown-shaped closure.

The present invention also provides a process for detaching the inscription easily and completely together with the sealing liner, and retaining the internal pressure of any beverage.

Preferably, the closure includes a closure shell and a detachable sealing liner and allows for detaching the inscription easily and completely together with the sealing liner. A minimum of materials and steps in the process are required instead of the multi-layers used with common procedures. The coating used in this process preferably includes a mixture of synthetic resins and solvents.

The transfer inks are preferably formulated with synthetic resins and oil as plasticizer, which imparts strong adhesion to the sealing liner formulated with PVC (polyvinyl chloride).

FIG. 1 shows a preferred crown cap, which includes a metallic shell 1, a coating layer 2 on the product side, which includes one or more synthetic epoxy resins (crosslinked with phenolic), amino, melamine or urea resins. Transfer ink 3 is applied over the coating in the same area as the sealing PVC liner 4. The coating layer 2 is an epoxy varnish.

A preferred epoxy varnish includes the following epoxy resin:

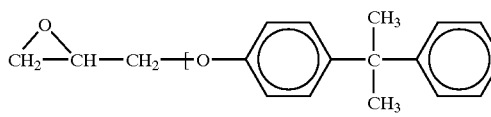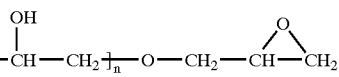

In the formula above, n is an integer ranging from 4 to 20. This range includes all values and subranges therebetween, including 4, 5, 6, 7, 8, 9, 10, 12, 14, 15, 16, 17, 18 and 19.

At the time of varnish application, the epoxy varnish preferably has the following composition, with the variable quantities in the weight percentages indicated, based on the total weight of the applied varnish:

| | |
|---|---|
| Solvent | 59–80%; |
| Synthetic epoxy resin | 20–30%; |
| Synthetic amino resin | 5–10%; and |
| Silicon or polyethylene wax | 0–5%. |

Preferred examples of the solvent include butyl cellosolve, methyl isobutyl ketone; heavy aromatic solvents; butanol, xylene and toluene. Mixtures of solvents are possible.

Preferred examples of epoxy resins includes epoxy material with n between 4 and 20 with hydroxyl equivalent from 100 to 250 and epoxy equivalent from 300 to 500. These ranges include all values and subranges therebetween, including 5, 7, 9, 11, 12, 14, 16 and 18 (for n); 110, 125, 135, 150, 175, 200, 225 and 245 (for hydroxyl equivalent); and 310, 325, 335, 350, 375, 400, 425, 450 and 475 (for epoxy equivalents). Hydroxyl and epoxy equivalents are terms related to the molecular weight of the polymer. Preferably, hydroxyl equivalent and epoxy equivalent are the grams of the polymer that contains one equivalent of hydroxyl or epoxy group, respectively.

Preferred examples of amino resins include alkylated urea-formaldehyde resin, melamine formaldehyde resin, hexamethoxymethylmelamine and benzoguanamine resin. Mixtures are possible.

Preferred examples of waxes include mineral waxes such as paraffins from petroleum distillation; natural waxes such as carnauba and candelilla. Mixtures are possible. Mixtures of waxes with polyethylene, polyisobutylene or ethyl cellulose are more preferred.

Preferred examples of applying the epoxy varnish include any one of the following methods: with rollers onto flat metal sheet during lithographic process, electro deposition (coil coating) or spray application technology.

The above percentages are preferably based on the total weight of the applied epoxy varnish. Once the varnish is baked, the solvent is substantially no longer present.

The above range given for the solvent includes all values and subranges therebetween, including 60, 65, 67, 70, 73, 75, 77, and 79%.

The above range given for the synthetic epoxy resin includes all values and subranges therebetween, including 21, 22, 23, 24, 25, 26, 27, 28 and 29%.

The above range given for the synthetic amino resin includes all values and subranges therebetween, including 6, 7, 8, and 9%.

The above range given for the silicon or polyethylene wax includes all values and subranges therebetween, including 1, 2, 3 and 4%.

The epoxy coating is preferably applied over the metallic substrate and is baked over 170° to 210° C. for a period of 8–15 minutes. The resulting coating has excellent adhesion with the metallic substrate protecting it against corrosion and scratching and has a properly peel off adhesion with any polyester based ink. The above ranges each independently include all values and subranges therebetween, including 175, 180, 185, 190, 195, 200 and 205° C.; and 9, 10, 11, 12, 13 and 14 minutes as appropriate.

The cap is most preferably produced as follows:
  metallic sheets are covered with epoxy varnish and are baked at 170° C. for a period of 8 to 15 minutes;
  the opposite side of the sheet is printed with the desirable logos for the crown;
  the transfer ink is applied over the epoxy varnish and baked at 150° C.;
  transfer inks are printed over this coating with specific baking schedules to control the strength of adhesion;
  after the crown cap portion is manufactured, the sealing liner is molded inside the closure cap.

Transfer inks 3 are preferably formulated with organic pigments in a vehicle containing one or more synthetic polyester resin. The preferred polyester resin has the following formula:

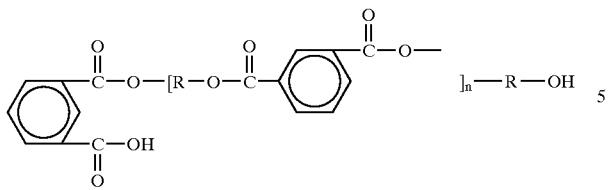

In the formula above, n is an integer having a value ranging from 1–80, preferably 5–60, more preferably 10–20. These ranges include all values and subranges therebetween, including 2, 3, 4, 6, 7, 8, 9, 12, 14, 22, 25, 30, 40, 50 and 70.

In the formula above, R is a $C_{1-18}$ alkylene group, preferably a $C_{2-16}$ alkylene group, more preferably a $C_{4-10}$ alkylene group. These ranges include all values and subranges therebetween, including groups with 3, 5, 6, 7, 8, 9, 12, 14, 15, and 17 carbons. Mixtures are possible.

Preferable polyester resins result from a condensation reaction between a polyfunctional alcohol and a polyfunctional acid. Preferred examples of polyfunctional alcohols include ethylene glycol, trimethylol propane, diethyleneglycol, pentaerythritol, propylene glycol, dipentaerythritol, sorbitol, glycerol and mannitol. Preferred examples of polyfunctional acids include phthalic anhydride, carbic anhydride, succinic acid, adipic acid, azelaic acid, sebacic acid, maleic acid, maleic anhydride, fumaric acid, citric acid, aconitic acid and tricarballylic acid. Mixtures of polyesters are possible.

The ink may optionally include any of the conventional additives such as pigments, fillers, solvents, carriers, antistatic agents, binders, and the like. Mixtures are possible.

The resin plasticizer has high affinity with the sealing liner plasticizer. Preferred examples of the plasticizer include dioctyl adipate, diisodecyl phthalate, dioctyl sebacate or dioctyl phthalate having the formula:

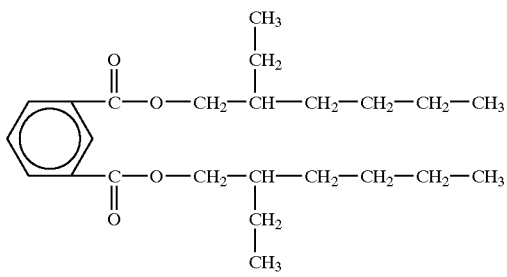

Mixtures of plasticizers are possible.

The transfer ink 3 will have limited adhesion with varnish 2, but very strong adhesion with sealing liner 4.

Sealing liner 4 includes one or more conventional PVC resins. The PVC may be foamed or not foamed. In addition to the PVC, the sealing liner may also and optionally include one or more additives such as plasticizer, thermal stabilizer, lubricant and pigments appropriate. Mixtures are possible.

Preferred PVC resins include those polymerized by any of bulk, solvent, suspension or emulsion methods.

Preferably, the metal material for the cap includes tin free steel or electrolytic tin plate.

Having now fully described this invention, it will be apparent to one of ordinary skill in the art that many changes and modifications can be made thereto without departing from the spirit or scope of the invention as set forth herein.

What is claimed is:

1. A container closure, comprising:

a metal closure shell having a top surface and a bottom surface, the top and bottom surfaces having respective varnish coatings thereon;

a detachable sealing liner in contact with a portion of the varnish-coated bottom surface; and a print layer comprising a polyester ink and interposed between the varnish-coated bottom surface and the liner;

wherein the liner comprises a polyvinyl chloride resin, wherein the print layer is in direct contact with the liner and the varnish-coated bottom surface, wherein the varnish comprises an epoxy resin;

wherein no adhesive is present between said liner and said varnish-coated bottom surface, and wherein when the liner is detached from the shell, said print layer remains in contact with the liner and not with the varnish-coated bottom surface.

2. The closure of claim 1, wherein the epoxy resin comprises a synthetic epoxy resin crosslinked with at least one selected from the group consisting of phenolic, amino, melamine, urea, and a combination thereof.

3. The closure of claim 1, wherein the epoxy resin is an epoxy-phenolic resin having the following formula:

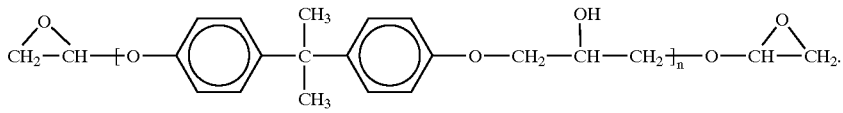

4. The closure of claim 1, wherein the print layer ink further comprises a plasticizer.

5. The closure of claim 4, wherein the plasticizer is selected from the group consisting of dioctyl phthalate, dioctyl adipate, and a combination thereof.

6. The closure of claim 1, wherein the polyester ink comprises a polyester resin having the following formula:

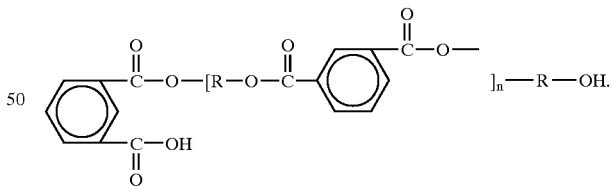

7. The closure of claim 1, wherein the print layer ink has a greater adhesive affinity for said liner than for said varnish coating.

8. The closure of claim 1, wherein the bottom surface of the metal closure shell has a shape which corresponds to an opening of a container.

9. The closure of claim 1, wherein the liner is a single layer.

10. The closure of claim 1, wherein the liner is opaque or transparent.

11. The closure of claim 1, wherein the liner comprises a means for sealing a container opening.

12. The closure of claim 1, wherein the liner has a greater adhesive affinity for said print layer than for said varnish coating.

13. The closure of claim 1, wherein the liner comprises a means for maintaining an internal pressure of a container.

14. The closure of claim 1, wherein said liner further comprises a plasticizer.

15. The closure of claim 1, wherein said metal closure is selected from the group consisting of a crown closure and a screw closure.

16. A method for sealing a container opening, comprising contacting the closure of claim 1 with the container opening.

17. A method, comprising:
removing the closure of claim 1 from a container sealed with said closure, and
detaching said liner.

18. An article, comprising:
a container having an opening; and
the closure of claim 1 in contact with said container and sealing said opening.

19. A method for making the closure of claim 1, comprising:
contacting said shell, said print layer and said liner.

* * * * *